R. H. SILCOCK.
AUTOMATIC FEEDING MECHANISM FOR HARD GREASE CUPS.
APPLICATION FILED MAR. 26, 1917.
1,251,702.
Patented Jan. 1, 1918.
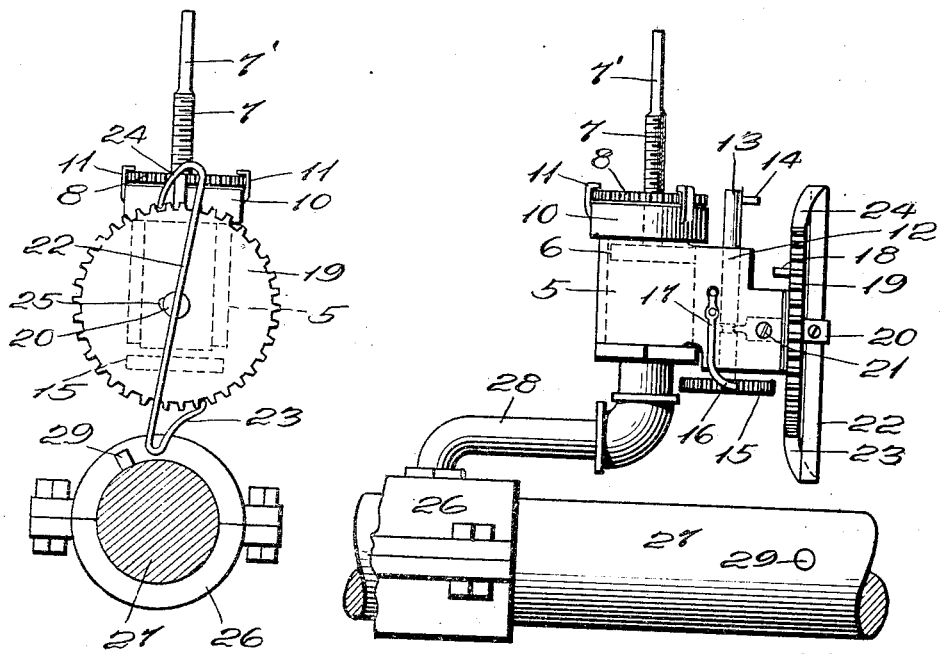
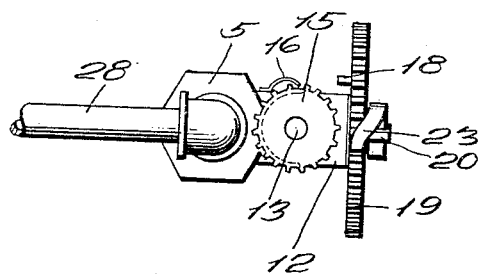
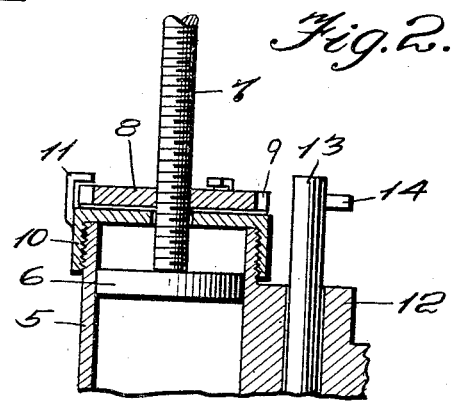
Fig.1. Fig.2. Fig.3. Fig.4.
Witnesses:
R. N. Boorman
Anita R. Hauges
Inventor
Robert H. Silcock
By Samuel H. Mick,
Attorney

UNITED STATES PATENT OFFICE.

ROBERT H. SILCOCK, OF BUFFALO GAP, SOUTH DAKOTA.

AUTOMATIC FEEDING MECHANISM FOR HARD-GREASE CUPS.

1,251,702.　　Specification of Letters Patent.　　Patented Jan. 1, 1918.

Application filed March 26, 1917. Serial No. 157,385.

*To all whom it may concern:*

Be it known that I, ROBERT H. SILCOCK, a citizen of the United States, residing at Buffalo Gap, in the county of Custer and State of South Dakota, have invented certain new and useful Improvements in Automatic Feeding Mechanisms for Hard-Grease Cups, of which the following is a specification.

This invention relates to grease cups and more particularly to an automatic feeding means for hard grease cups by means of which hard grease may be automatically delivered to a bearing so slowly and in such small quantities as to effectually prevent the marked waste which has heretofore been incidental to the use of grease cups of the ordinary type.

Further objects and advantages of the invention will be set forth in the detailed description which now follows:

In the accompanying drawing,

Figure 1 is a front elevation of a hard grease cup constructed in accordance with the invention.

Fig. 2 is a side elevation thereof.

Fig. 3 is a bottom plan view of the grease cup, and

Fig. 4 is a partial, sectional view through the grease receiving cylinder, or cup.

Like numerals designate corresponding parts in all of the figures of the drawing.

In carrying out the invention I provide a grease cup or cylinder 5 having a piston 6 mounted therein. This piston is carried by a threaded stem 7 which stem has threaded engagement with a nut 8 having teeth 9 about its periphery. This nut is mounted for rotation upon the top of the cap 10 of the cylinder and is held against vertical movement by fingers or equivalent devices 11. Mounted for rotation in a bearing extension 12 carried by the cylinder 5 is a shaft 13 which shaft carries a tooth 14 adapted to mesh with the teeth 9 of the nut 8 to impart movement to said nut at each rotation of the shaft 13. Mounted upon the lower end of the shaft 13 is a ratchet wheel 15, this ratchet wheel being held against retrograde movement by a spring finger 16, the body 17 of which is soldered or otherwise secured to the bearing extension 12. Motion is imparted to the ratchet wheel 15 by a pawl tooth 18, said pawl tooth projecting rearwardly from the face of a ratchet wheel 19. The ratchet wheel 19 is mounted for rotative movement upon post 20, said post entering the bearing extension 12 and being fixed therein by a set screw 21. The post 20 is slotted for the reception of a spring steel strip 22. The lower end of this strip is provided with an upturned tongue 23 which constitutes an actuating pawl for the ratchet wheel 19 and the upper end of the strip 22 is provided with a downwardly bent tongue 24 which constitutes a retaining dog to prevent reverse movement of the ratchet wheel 19. The strip 22 is held in place within the post 20 by means of a retaining screw 25. The bearing to be lubricated is indicated at 26. 27 indicates the shaft mounted in said bearing and 28 indicates a goose neck extending between the bottom of the cup 5 and the bearing 26. The shaft 27 is provided with a pin 29 adapted to strike against the lower part of the strip 22 to cause the pawl 23 to actuate the ratchet wheel 19. The degree to which the ratchet wheel is actuated by the pawl may be adjusted and varied by loosening the set screw and turning the post 20 to bring the lower portion of the strip 22 toward the pin 29 or to move said strip away from the pin 29. If the strip is moved toward the pin 29 it follows that a greater movement will be imparted to the ratchet wheel 19 while if the strip 22 is moved away from the pin 29 or moved in the direction of movement of pin 29 it follows that the pin 29 will clear the strip sooner and consequently less movement will be imparted to the ratchet wheel 19.

The structure herein shown and described is well adapted to serve the purpose outlined in the preamble to this specification. The parts are so correlated and arranged that the grease cup will only be emptied after a great many revolutions of the shaft 27. As a matter of fact I have constructed a model of the grease cup herein shown and described in which it would be necessary for shaft 27 to make approximately one hundred thousand revolutions before the grease cup would be emptied.

It is well known that a great deal of grease is wasted with the cup now in use and particularly with the cups that are manually operated. The operators in order to be upon the safe side force a great deal more grease into the bearings than is required. With the structure herein shown and described it will be possible to provide just exactly the amount required to properly lubricate the bearings and yet prevent the enormous waste that has been occasioned by the use of grease cups of the ordinary type.

It is to be noted that there will be no possibility of damage to the structure by reason of the plunger or piston 6 bottoming in the cups or cylinder 5 because before the piston reaches the bottom of the cup the nut 8 will reach an unthreaded portion of the stem 7, said unthreaded portion being indicated at 7' whereupon further downward movement of the plunger will be prevented. While I have illustrated a pin 29 as the element which actuates the lower part of the spring steel strip 22 it is to be understood that any desired form of tappet may be provided upon the shaft 27.

While I have illustrated the cup as being fixed and the rotative part as carrying the tappet it is apparent that this structure is adapted for use on moving parts such as cranks and the like in which case it is only necessary to provide some fixed element with which the spring strip 22 will come in contact during the rotation of the part to be lubricated.

Having described my invention what I claim is:—

1. A device of the character described, comprising a plunger to be moved, a threaded stem for said plunger, a toothed nut upon said stem, a shaft extending parallel with the stem and provided with a tooth for engaging the teeth of said nut, a ratchet wheel, the axis of which is at right angle to the axis of said shaft, a ratchet wheel upon said shaft, a tooth carried by the first named ratchet wheel and adapted to impart a step by step movement to the last named ratchet wheel and automatic means actuating the first named ratchet wheel, said means comprising a fixed post upon which the first named ratchet wheel rotates, means for adjusting said post about its axis, a spring steel strip carried by said post bent to form a pawl for engaging the first named ratchet wheel, and a tappet carried by the part to be lubricated, said strip being adjustable from and toward said tappet by the rotative adjustment of said post.

2. A device of the character described comprising a hard grease cup, a piston therein, a threaded stem for said piston, said stem comprising likewise an unthreaded portion, a nut engaged with the threaded portion of said stem and having teeth about its periphery, means for retaining said nut against vertical movement, a bearing extension carried by the cup, a shaft extending longitudinally alongside of the cup and having its bearing in said extension, a tooth carried by said shaft and adapted to engage the nut and impart movement to the same, a toothed member mounted upon said shaft, a ratchet wheel, a tooth carried by said ratchet wheel and adapted to engage the last named toothed member, a fixed post upon which the ratchet wheel turns, a set screw for binding said fixed post in varying position of adjustment and a spring steel strip carried by said fixed post and having one of its ends bent to form an actuating dog for the ratchet wheel and the other of its ends bent to form a retaining dog for the ratchet wheel.

3. The combination with a moving part to be lubricated, of a grease cup therefor, a plunger disposed in said grease cup and actuating mechanism for said plunger comprising a ratchet wheel, a spring pawl and a member carried by the moving part adapted to contact with said spring pawl once in each revolution of the moving part, a post by which the spring pawl is carried and means for adjusting said post about its axis.

4. A device of the character described comprising a hard grease cup, a plunger therein, a threaded stem for said plunger, a nut mounted to rotate in a horizontal plane upon the top of said grease cup and having engagement with said threaded stem, an integral bearing extension carried by the grease cup, a shaft mounted in said bearing extension and extending in parallelism with said threaded stem, peripheral teeth formed upon said nut, an extension carried by said shaft and engaging said teeth to impart a step by step movement to the nut at each rotation of said shaft, a toothed wheel upon the lower end of said shaft, a fixed post secured in the bearing extension, a ratchet wheel mounted to turn thereon and a projection extending from the rear face of the ratchet wheel and adapted to engage the teeth of the last named toothed wheel at each revolution of the ratchet wheel and a spring pawl carried by said fixed post and engaging said ratchet wheel.

In testimony whereof I affix my signature.

ROBERT H. SILCOCK.